United States Patent
Dutta et al.

(10) Patent No.: US 10,358,969 B2
(45) Date of Patent: Jul. 23, 2019

(54) COOLANT CONTROL VALVE WITH THERMOELECTRIC GENERATOR

(71) Applicant: SCHAEFFLER TECHNOLOGIES AG & CO. KG, Herzogenaurach (DE)

(72) Inventors: Biplob Dutta, Flint, MI (US); Raghunath Paralkar, Shelby Township, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/718,408

(22) Filed: Sep. 28, 2017

(65) Prior Publication Data

US 2019/0093543 A1 Mar. 28, 2019

(51) Int. Cl.
  *F01P 3/20* (2006.01)
  *G05D 23/19* (2006.01)
  *F03G 7/06* (2006.01)
  *F01P 7/14* (2006.01)

(52) U.S. Cl.
  CPC .............. *F01P 3/20* (2013.01); *F01P 7/14* (2013.01); *F03G 7/06* (2013.01); *G05D 23/19* (2013.01); *F01P 2007/146* (2013.01); *F01P 2050/24* (2013.01); *F01P 2060/185* (2013.01)

(58) Field of Classification Search
  CPC .............. F01P 3/20; F01P 7/14; F01P 2007/146; F01P 2050/24; F01P 2060/185; G05D 23/19; F03G 7/06
  USPC ............ 60/516, 529, 531; 251/11; 236/68 R, 236/68 C
  See application file for complete search history.

(56) References Cited

U.S. PATENT DOCUMENTS

| | | | |
|---|---|---|---|
| 2,879,641 A * | 3/1959 | Johnson | G05D 23/1921 236/68 R |
| 2,989,281 A | 6/1961 | Fritts | |
| 4,711,270 A * | 12/1987 | Fornasari | F25B 41/04 137/625.5 |
| 5,544,478 A | 8/1996 | Shu et al. | |
| 5,653,111 A | 8/1997 | Attey et al. | |
| 2005/0056799 A1 | 3/2005 | Malone | |
| 2011/0239635 A1* | 10/2011 | Prior | F01N 3/02 60/320 |

(Continued)

FOREIGN PATENT DOCUMENTS

| CN | 202991209 U | 6/2013 |
|---|---|---|
| JP | 59170421 A2 | 9/1984 |

(Continued)

*Primary Examiner* — Hoang M Nguyen
(74) *Attorney, Agent, or Firm* — Matthew V. Evans

(57) ABSTRACT

A coolant control valve (CCV) includes an outer housing, an actuator, a valve body, and one or more thermoelectric generators (TEGs). The outer housing includes at least one inlet and at least one outlet. The TEG is operatively connected to the actuator and can be a lone source of power to the CCV or assist a primary power source. The CCV can utilize a power management device that can receive power input from either the TEG or the primary power source. The TEG has a first surface and a second surface, either of which can be exposed to air or a cooling system fluid or coolant; the coolant can be water, ethylene glycol, a combination thereof, or any other fluid that is utilized in a system that provides temperature management for a component or system.

20 Claims, 7 Drawing Sheets

(56) References Cited

U.S. PATENT DOCUMENTS

| | | | | |
|---|---|---|---|---|
| 2011/0239964 A1* | 10/2011 | Prior | ................. | F01N 5/025 |
| | | | | 123/41.08 |
| 2016/0099398 A1* | 4/2016 | Lorimer | ................. | H01L 35/30 |
| | | | | 136/201 |
| 2016/0347152 A1* | 12/2016 | Nam | ................. | B60H 1/3227 |
| 2017/0335805 A1* | 11/2017 | Zhang | ................. | F01P 3/20 |

FOREIGN PATENT DOCUMENTS

| | | |
|---|---|---|
| JP | 2005061260 A2 | 3/2005 |
| JP | 2006097529 A | 4/2006 |
| RU | 2204030 C1 | 5/2003 |
| RU | 2205279 C2 | 5/2003 |
| RU | 2227218 C1 | 4/2004 |

\* cited by examiner

COOLANT CONTROL VALVE WITH THERMOELECTRIC GENERATOR

TECHNICAL FIELD

Example aspects described herein relate to coolant control valves (CCVs) for use within fluid cooling systems.

BACKGROUND

As fuel economy becomes paramount in the transportation industry, efforts have increased to achieve higher internal combustion (IC) engine efficiencies and to seek alternative powertrains. CCVs are well known and can be arranged to provide coolant flow control for temperature management of various powertrain components including IC engines, transmissions and various components of hybrid electric and fuel cell vehicles.

A portion of CCVs are electro-mechanical in design, incorporating an electrical actuator assembly that interfaces with a mechanical valve body to provide a controlled flow of coolant for a selected powertrain component or system. Depending on its design, the mechanical valve body can be linearly actuated or rotary actuated by an actuator, often times in the form of an electric motor or solenoid. When used in an IC engine, the electric motor can be controlled by an electronic controller in the form of an engine control unit (ECU). The valve body can be configured with one or more fluid openings that control an amount of coolant flow to or from one or more inlets or outlets arranged on an outer housing of the coolant control valve. Electro-mechanical CCVs can offer continuously variable positions of the valve body to achieve various coolant flow rates. Like many other electronic controlled engine components, a fail-safe design feature is required that facilitates safe operation of the engine in the event of an electrical power loss. For this reason, some electro-mechanical CCV designs incorporate a wax pellet thermostat that enables coolant flow from the IC engine to a radiator, preventing an engine overheat condition in the event of a power loss. However, such a thermostat requires valuable packaging space within an already envelope space-challenged CCV.

The demand on vehicular electrical systems has grown substantially in recent times, not only due to the advancement of engine, entertainment, comfort, and safety systems, but also due to the advent of start-stop systems. Such growth has prompted a need for alternative power sources that can reduce demands on electrical systems while also providing a back-up source for power.

Thermoelectric devices or generators are known and can be used to generate electrical power from a temperature difference applied to two sides of a semiconductor material. Thermoelectric devices offer a reliable and simple power generation solution because they convert thermal energy into electricity without requiring moving components.

SUMMARY

A CCV is provided that includes an actuator, a valve body actuated by the actuator, an outer housing, and a thermoelectric generator (TEG) operatively connected to the actuator. The outer housing includes at least one inlet and at least one outlet. The TEG has a first surface in contact with a first medium and a second surface in contact with a second medium. The first surface can be an outer surface and the second surface can be an inner surface. The first and second media can either be comprised of a fluid, such as cooling system fluid, or comprised of air. The CCV can include a power management device that can receive power input from either the TEG or a primary power source. The TEG can alone power the actuator or assist the primary power source to power the actuator. The outer housing can be fabricated from plastic and the TEG can be overmolded within the outer housing. The TEG can be arranged at any location on or within the CCV, including, but not limited to, end cover, inner wall, or longitudinal outer wall locations within the outer housing.

A method of operating a CCV is provided that comprises: detecting a failure of the primary power source to deliver adequate power to the CCV; receiving an electronic signal to utilize power generated from the TEG arranged within the CCV; powering the CCV by the TEG; receiving an electronic signal to actuate the valve body to a desired position; and, actuating the valve body to the desired position.

Another method of operating a CCV is provided that comprises: powering the CCV by at least one of the TEG arranged within the CCV and the primary power source; receiving an electronic signal to actuate the valve body to a desired position; and, actuating the valve body to the desired position.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Figure 1A:
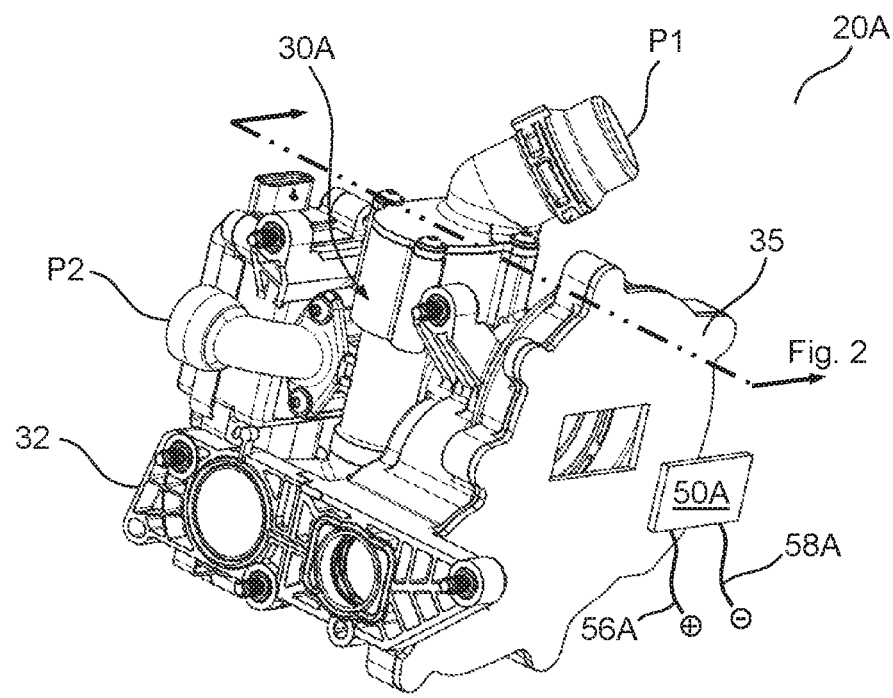
FIG. 1A is a partially exploded perspective view of an example embodiment of a coolant control valve (CCV) having a thermoelectric generator (TEG).

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. Circumferentially refers to an outer boundary of a circle or curve. The words "left" and "right" designate directions in the drawings to which reference is made. The terminology includes the words specifically noted above, derivatives thereof, and words of similar import.

Figure 7:
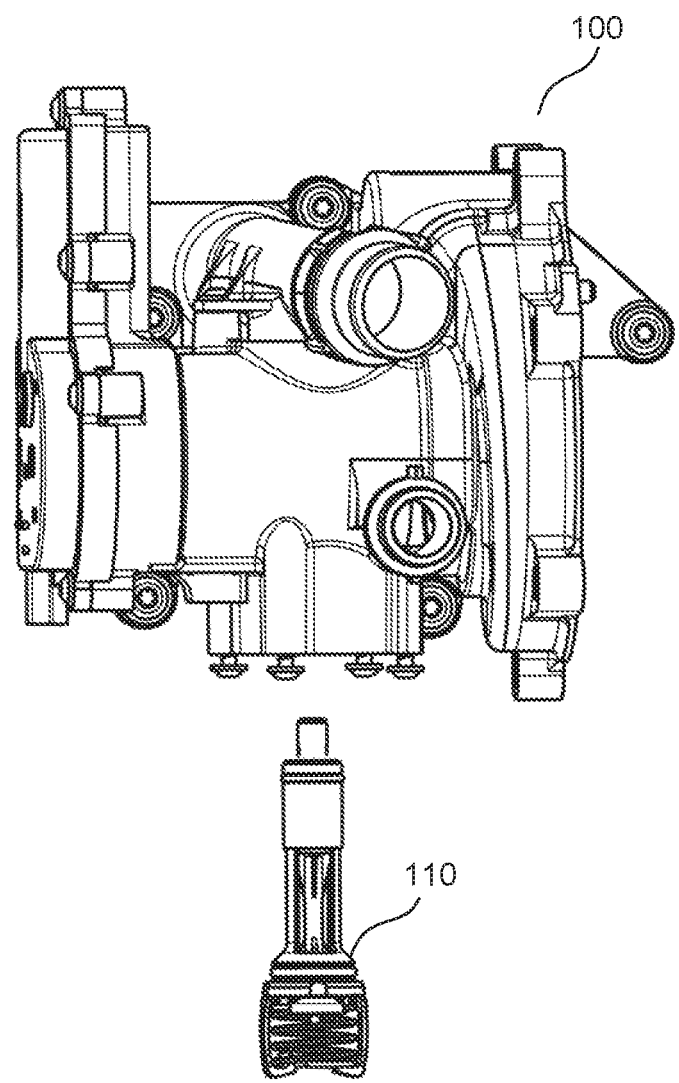
FIG. 7 is a partially exploded perspective view of a prior art CCV.

A partially exploded perspective view of a prior art coolant control valve (CCV) 100 is shown in FIG. 7 that includes a wax-pellet thermostat valve 110. The thermostat valve 110 ensures that, in an instance of a power failure to the CCV 100, hot coolant will cause the wax to expand and induce an open state, permitting flow of coolant from a powertrain component to a heat exchanger (not shown), and thus, preventing overheating of the powertrain component. The large size of the thermostat valve 110 impacts the overall packaging size of the CCV 100, and its function can not be guaranteed in the event of a CCV power failure, as failure modes and lifetime limitations exist for wax-pellet thermostat valves.

Figure 1B:
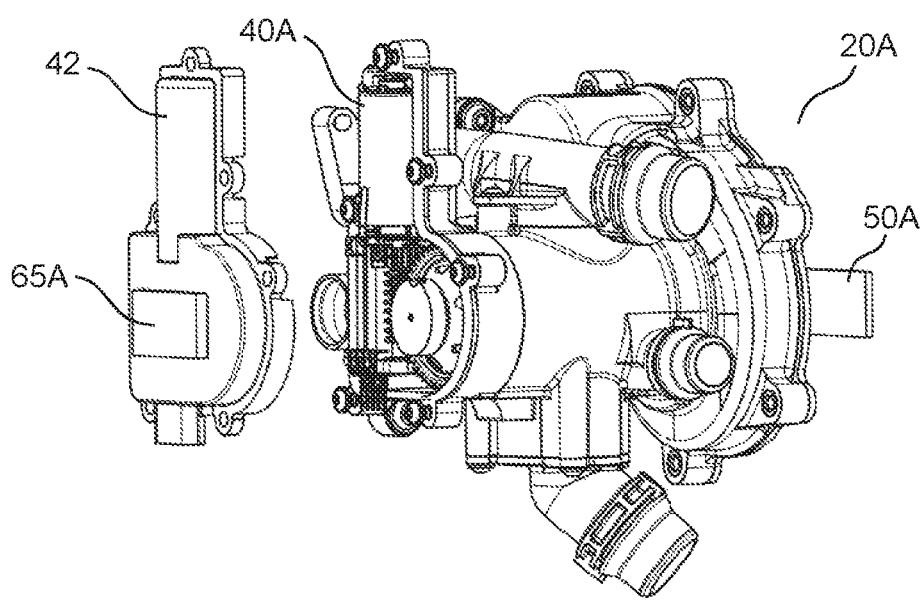
FIG. 1B is a partially exploded perspective view of the CCV of FIG. 1A.
Figure 2:
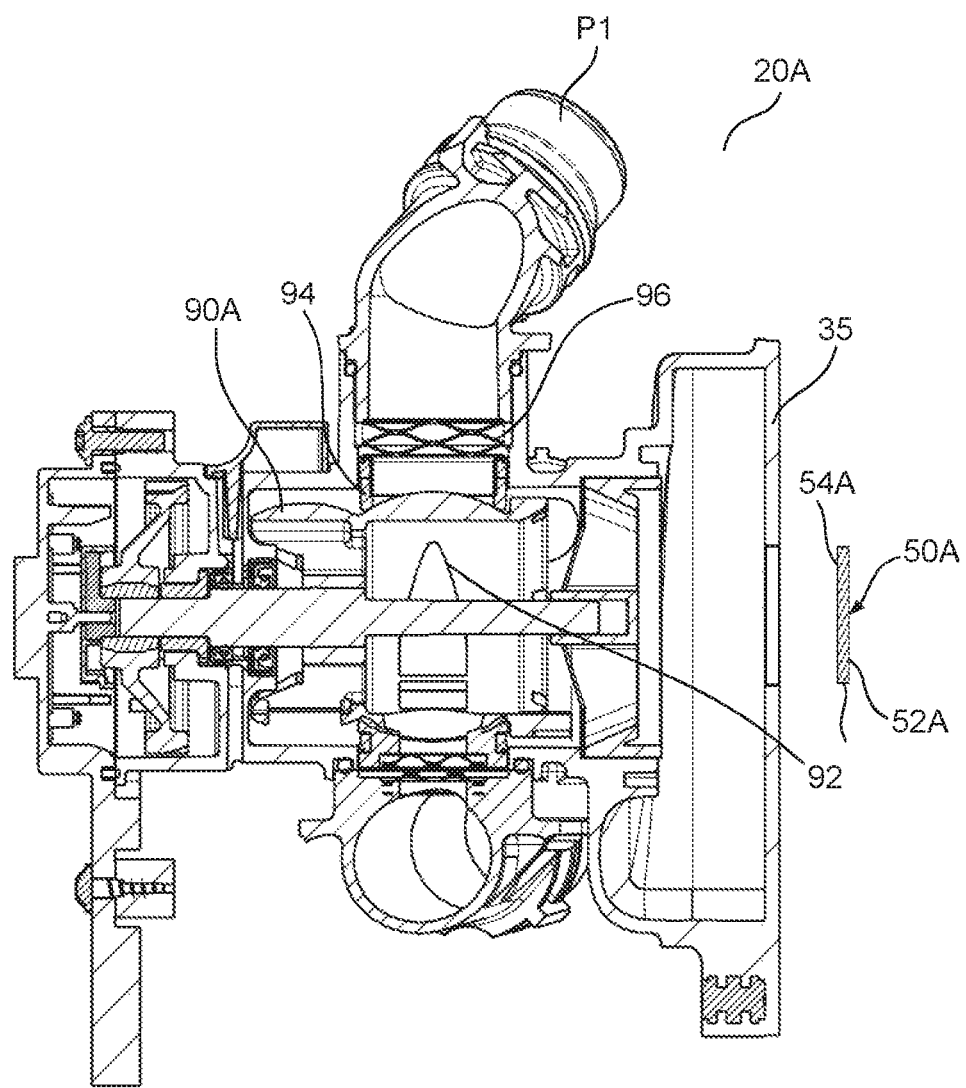
FIG. 2 is a cross-sectional view of the CCV of FIG. 1A.
Figure 3:
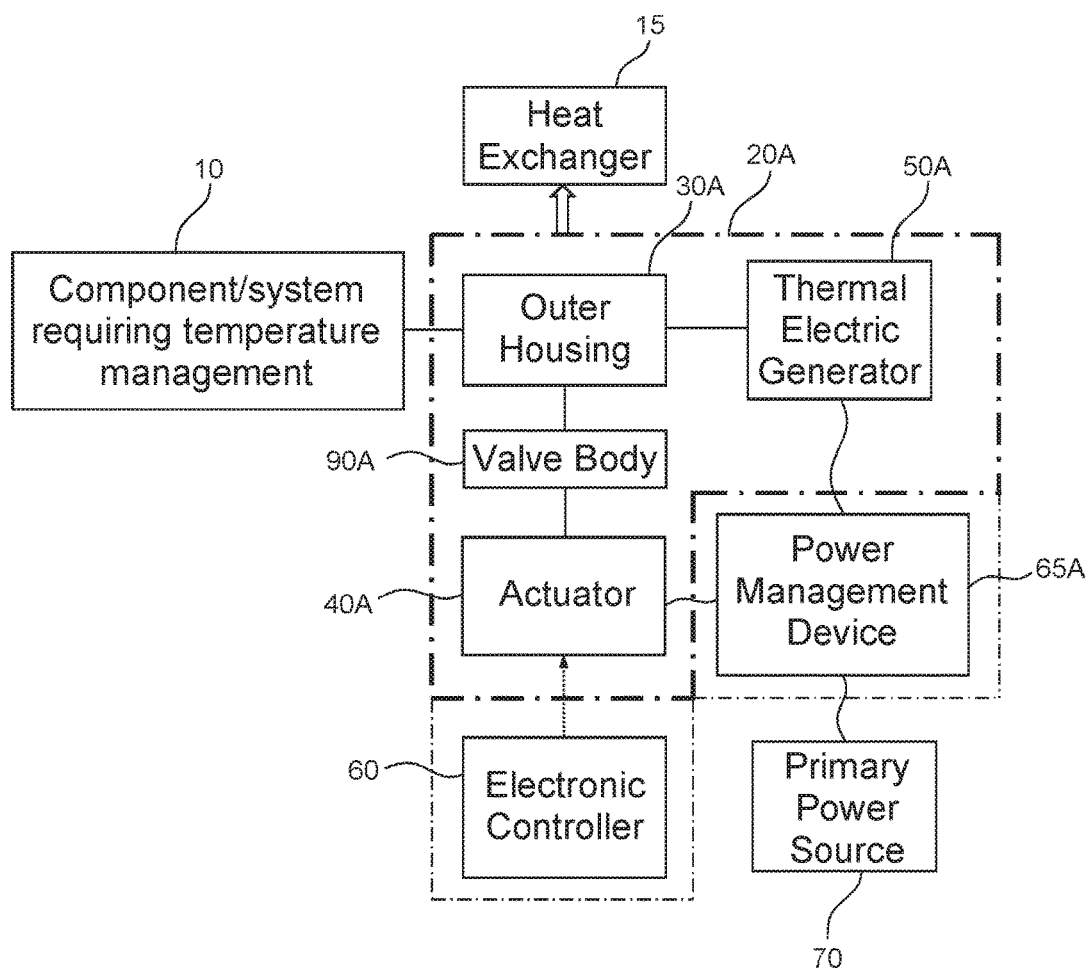
FIG. 3 is a block diagram of the CCV of FIG. 1A within an electronically controlled fluid system of a component or system requiring temperature management.

FIGS. 1A and 1B show a partially exploded perspective view of an example embodiment of a CCV 20A having a thermoelectric generator (TEG) 50A. FIG. 2 shows a cross-sectional view of the CCV 20A of FIG. 1A. FIG. 3 shows a block diagram of the CCV 20A of FIG. 1A within an electronically controlled fluid system of a component or system requiring temperature management 10. The following discussion should be read in light of FIGS. 1A, 1B, 2, and 3. The CCV 20A includes an outer housing 30A, an actuator 40A in a form of an electric motor, and a valve body 90A. The outer housing 30A includes a mounting portion 32, an end cap 35, and an inlet P1 and an outlet P2. The term "inlet" represents any form of a fluid entrance to the outer housing 30A, and the term "outlet" represents any form of a fluid exit from the outer housing 30A. Additional inlets or outlets in different forms and configurations from those shown in the figures are also possible. The valve body 90A, configured with a fluid opening 92 through which fluid can flow from the inlet P1, is rotationally actuated by the actuator 40A; an electronic controller 60, located either within the CCV 20A or outside of the CCV 20A, controls the actuator 40A to manage an angular position of the valve body 90A. An optional seal 94, biased by a resilient element 96, can be present within the inlet P1 to prevent or minimize fluid leakage between the valve body 90A and the inlet P1. The TEG 50A can be arranged within any component of the CCV 20A; in the example embodiment shown in FIGS. 1A, 1B and 2, it is arranged within the end cap 35 of the outer housing 30A. The TEG 50A can serve as a power source for the CCV 20A; more specifically, the TEG 50 can serve as a power source for the actuator 40A to actuate the valve body 90A and can be operatively connected to the actuator 40A by positive and negative leads 56A, 58A. A power management device 65A can optionally be located between the TEG 50A and the actuator 40A; this arrangement or any other arrangement of electrical components between the TEG 50A and the actuator 40A is possible and maintains the "operatively connected" definition between the TEG 50A and the actuator 40A. The TEG 50A is typically formed with semiconductor materials and can optionally include electrical components such as capacitors; the TEG 50A has a first surface 52A that is exposed to a first medium and a second surface 54A that is exposed to a second medium. The first medium can be comprised of air, such as the air surrounding an IC engine within a vehicle, and the second medium can be comprised of cooling system fluid or coolant, such as that found in an internal combustion (IC) engine; the first surface 52A can be an outer surface and the second surface 54A can be an inner surface. The coolant can be water, ethylene glycol, a combination thereof, or any other fluid that is utilized in a system that provides temperature management for a component or system. Functionality of the TEG 50A is achieved when a temperature differential exists between the first surface 52A and the second surface 54A. Alternatively stated, power or electricity is generated by the TEG 50A when a temperature differential exists between the two surfaces 52A, 54A, facilitated by a temperature differential between the first and second mediums. The component or system requiring temperature management 10 can be a vehicular powertrain component, such as an IC engine, a transmission, a battery pack, or a fuel cell stack. However, many other components or systems outside of vehicular powertrain systems could utilize the CCV 20A with the integrated TEG 50A. In an application such as an IC engine, a maximum temperature differential between the air surrounding the engine (first medium) and the coolant (second medium) within the CCV 20A can be 30 to 80° C., however, higher temperature differentials may also be possible.

The TEG 50A can either be a lone power source for the actuator 40A of the CCV 20A or serve as a power assist to a primary power source 70, such as an alternator or battery. The power management device 65A can be implemented to manage power input from both the TEG 50A and the primary power source 70 to power the actuator 40A. The power management device 65A can contain any one of a multitude of electrical elements, including, but not limited to capacitors and electrical filters. The TEG 50A and primary power source 70 can each provide 0 to 100% of the power required by the actuator 40A. Electrical current requirements of the actuator 40A typically range from 0.2 to 2.5 amps. The actuator 40A may be powered by both power sources simultaneously, or by only one of either the TEG 50A or the primary power source 70. Alternatively stated, the actuator 40A may be powered by at least one of the TEG 50A and the primary power source 70. In a first power state, the TEG 50A could provide a greater amount of power than the primary power source 70; and, in a second power state, the primary power source 70 could provide a greater amount of power than the TEG 50A. Different operating or ambient conditions can dictate a power management strategy. One possible scenario for use of the TEG 50A as a lone primary power source is when an IC engine is started and a failure to deliver power from the primary power source 70 to the CCV 20A occurs. As the engine warms up and transfers heat to the coolant, an adequate temperature differential can be present between the first and second surfaces 52A, 54A of the TEG 50A to power the actuator 40A of the CCV 20A, potentially adjusting the valve body 90A so that coolant is routed to a heat exchanger 15. Therefore, a primary power source failure of the CCV 20A does not render it inoperable and risk overheating of the component or system requiring temperature management 10. The power management device 65A can be integrated directly into the CCV 20A at various locations; the example embodiment in FIG. 1B shows its location within an actuator cover 42. However, the power management device 65A can also be attached to or integrated within other components outside of the CCV 20A. This location versatility of the power management device 65A is shown in FIG. 3; a thick dashed line surrounds the CCV 20A and its components, while thinner dashed lines surround the power management device 65A and electronic controller 60, both of which can optionally be integrated within the CCV 20A.

Figure 4A:
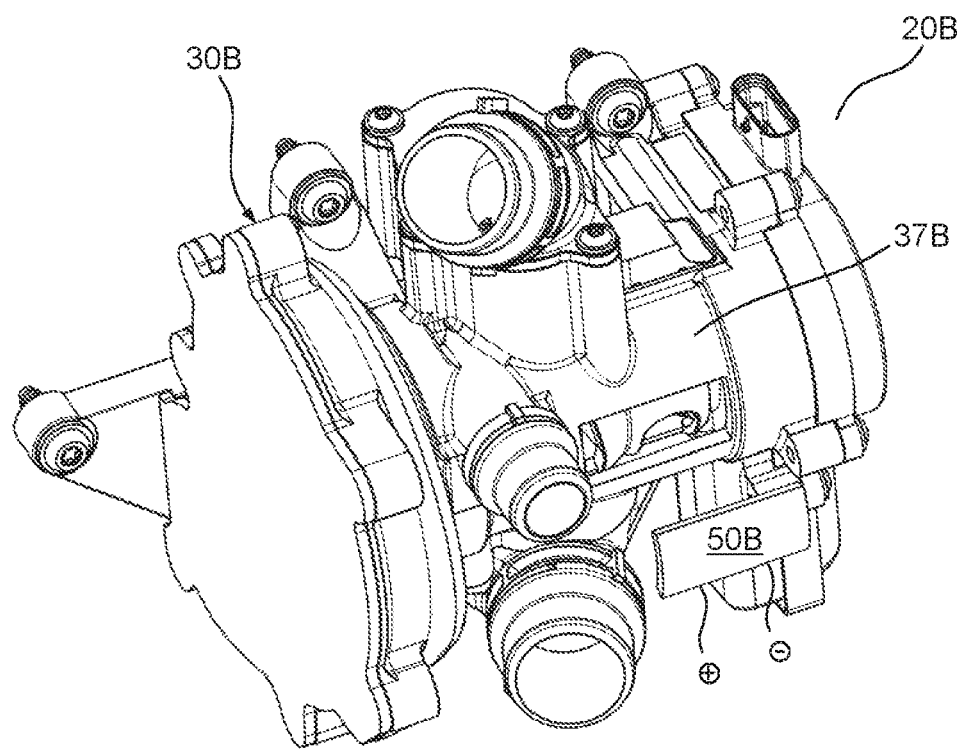
FIG. 4A is a partially exploded perspective view of an example embodiment of a CCV having a TEG.
Figure 4B:
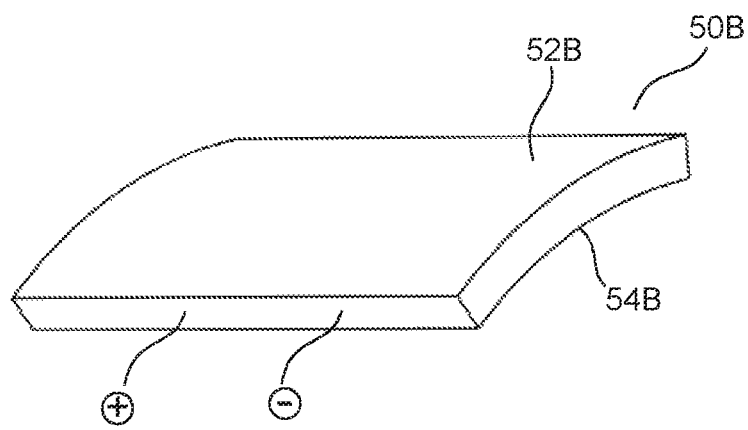
FIG. 4B is a perspective view of the TEG shown in FIG. 4A.

Referring now to FIG. 4A, another example embodiment of a CCV 20B is shown with a TEG 50B located on a longitudinal outer wall 37B of an outer housing 30B. Referring to FIG. 4B, the TEG 50B has a first surface 52B that is exposed to a first medium such as air, and a second surface 54B that is exposed to a second medium, such as cooling system fluid or coolant. The TEG 50B is curved in form to match that of the longitudinal wall 37B.

Figure 5A:
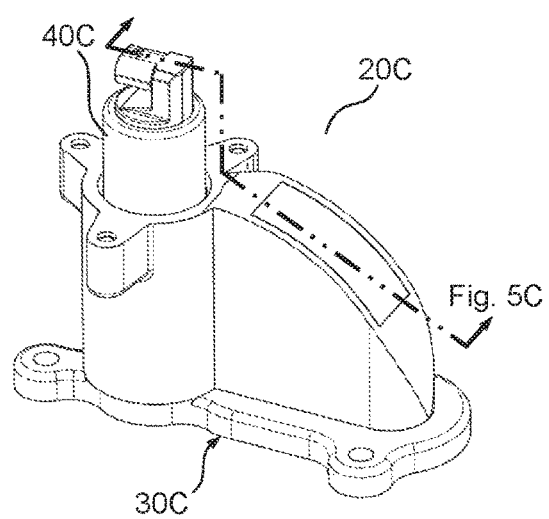
FIG. 5A is a perspective view of an example embodiment of a CCV having a TEG.
Figure 5B:
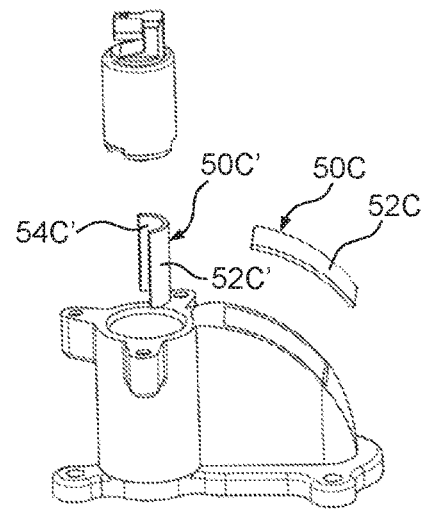
FIG. 5B is an exploded perspective view of the CCV of FIG. 5A.
Figure 5C:
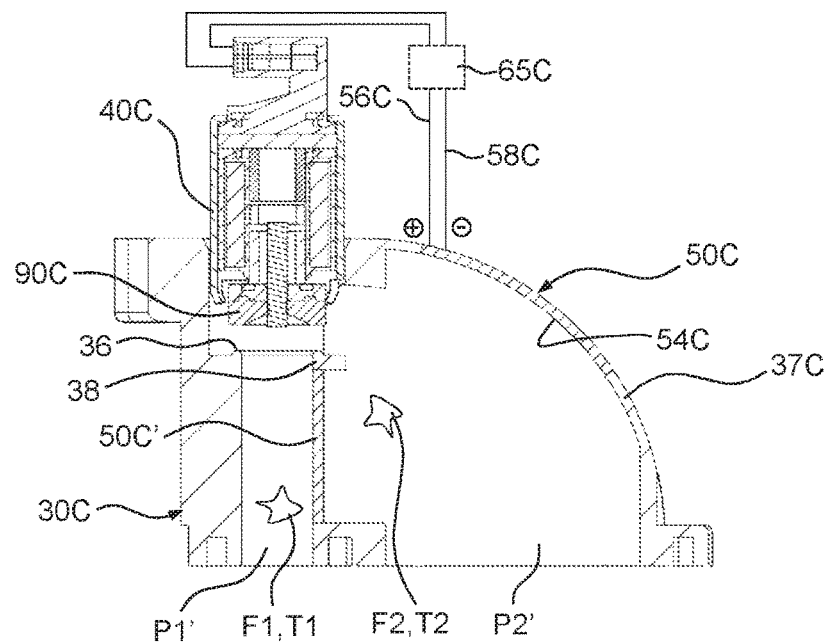
FIG. 5C is a cross-sectional view of the CCV of FIG. 5A.

Referring now to FIGS. 5A and 5B, an example embodiment of a CCV 20C having a first TEG 50C, and a second TEG 50C' is shown. In this example embodiment, an actuator 40C in a form of a solenoid linearly actuates a valve body 90C to engage or disengage a valve body seat 36 arranged within an outer housing 30C. When the valve body 90C is engaged with the valve body seat 36, fluid flow does not occur between an inlet P1' and an outlet P2'. Additional inlets or outlets in many different forms and configurations are also possible, potentially facilitating mixing of one or more fluids. When the valve body 90C is disengaged from the valve body seat 36, fluid flow can occur between the inlet P1' and outlet P2' of the outer housing 30C. Many other CCV arrangements having a linearly actuated valve body are also possible. The first TEG 50C is arranged in an outer wall 37C of the outer housing 30C and has a first surface 52C and a second surface 54C potentially in contact with media in the form of air and fluid, respectively, to generate electric power for the solenoid 40C when a temperature differential exists between the two surfaces 52C, 54C. Positive 56C and negative 58C leads, defining an electrical path, operatively connect the TEG 50C to the actuator or solenoid 40C. A power management device 65C, shown in broken lines, can optionally be located between the TEG 50C and the actuator 40C; this arrangement or any other arrangement of electrical components between the TEG 50C and the actuator 40C is possible and maintains the "operatively connected" definition of the TEG 50C and the actuator 40C. The second TEG 50C' is arranged in an inner wall 38 of the outer housing and has a first surface 52C' in contact with a first medium and a second surface 54C' in contact with a second medium. In this instance, the first medium can be comprised of a first fluid F1 at a first temperature T1 that flows through the inlet P1' and the second medium can be comprised of a second fluid F2 at a second temperature T2 that flows through the outlet P2'. A temperature differential (T2−T1) between the two fluids F1, F2 in contact with the respective first and second surfaces 52C', 54C' generates power in the second TEG 50C' for the actuator or solenoid 40C to linearly displace the valve body 90C. The second TEG 50C' is also operatively connected to the actuator or solenoid 40C. A maximum temperature differential between the first fluid F1 and the second fluid F2 within the CCV 20C can be 30 to 80° C., however, higher temperature differentials may also be possible. This example embodiment illustrates a potential for not only multiple TEGs within a CCV, but also for different pairings of media types that are possible amongst the TEGs (air/fluid and fluid/fluid).

The previously described TEGs 50A, 50B, 50C, and 50C' can be of any shape or form to be integrated within any component of a CCV, including, but not limited to, a contour of any wall of an outer housing. Furthermore, areas of the first and second surfaces, 52A-B-C-C', 54A-B-C-C', can be of any suitable area to provide adequate power to the TEGs 50A, 50B, 50C, 50C'.

The outer housings 30A, 30B, 30C can be formed of many different materials including metals and plastics. As plastics are becoming the material of choice for such complex geometries, an injection molding process can be utilized for the outer housings 30A, 30B, 30C; furthermore, the TEGs 50A, 50B, 50C, 50C' can be over-molded by their respective outer housings 30A, 30B, 30C, if desired. Other attachment methods and manufacturing processes are also possible.

Figure 6A:
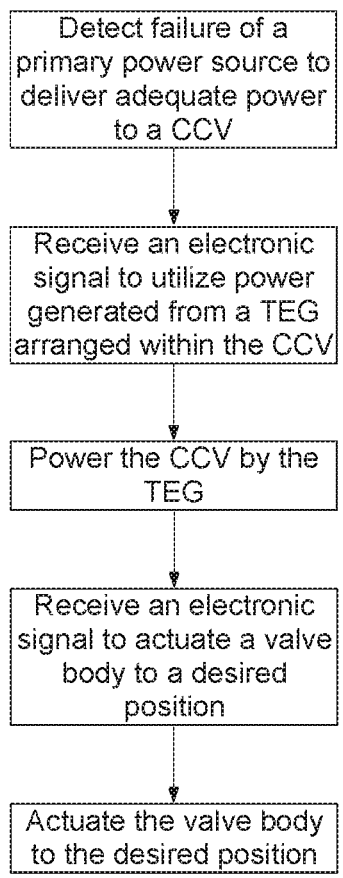
FIG. 6A is an example embodiment of a method of operating a CCV having a TEG.

Referring to FIG. 6A, the following describes one of many methods that are possible of operating the CCV 20A (shown in FIGS. 1A, 1B, 2 and 3) when a failure of the primary power source 70 occurs. Although the method is presented as a sequence of steps for clarity, no order should be inferred from the sequence unless explicitly stated. This method can also be applied to CCVs 20B and 20C and respective components. A first step detects a failure of the primary power source 70 to deliver adequate power to the CCV 20A. A second step receives an electronic signal to utilize power generated from the TEG 50A arranged within the CCV 20A. A third step powers the CCV 20A by the TEG 50A. A fourth step receives an electronic signal to actuate the valve body 90A to a desired position. A fifth step actuates the valve body 90A to the desired position. The third step can be accomplished by the power management device 65A, and the fifth step can be accomplished by the actuator 40A.

Figure 6B:
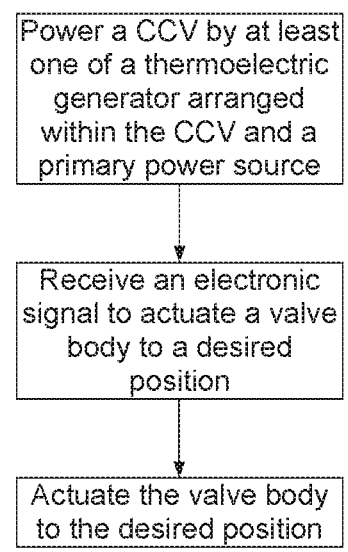
FIG. 6B is an example embodiment of a method of operating a CCV having a TEG.

Referring to FIG. 6B, the following describes another method of operating the CCV 20A (shown in FIGS. 1A, 1B, 2 and 3) when power is provided to the CCV 20A from either or both the primary power source 70 and the TEG 50A arranged within the CCV 20A. Many other methods of operation are also possible. This method can also be applied to CCVs 20B and 20C and respective components. A first step powers the CCV 20A by at least one of the TEG 50A arranged within the CCV 20A and the primary power source 70; stated otherwise, the actuator 40A can be powered by either the TEG 50A solely or the primary power source 70 solely, or by a combination of these two sources of power. A second step receives an electronic signal to actuate the valve body 90A to a desired position. A third step actuates the valve body 90A to the desired position. The first step can be accomplished by the power management device 65A, and the third step can be accomplished by the actuator 40A.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What we claim is:

1. A coolant control valve comprising:
   an actuator;
   a valve body actuated by the actuator;
   an outer housing having:
      at least one inlet; and,
      at least one outlet; and,
   at least one thermoelectric generator formed within a wall of the coolant control valve, the at least one thermoelectric generator having:
      a first surface in contact with a first medium; and,
      a second surface in contact with a second medium; and,
   the at least one thermoelectric generator operatively connected to the actuator.

2. The coolant control valve of claim 1, wherein the at least one thermoelectric generator generates power to solely power the actuator to actuate the valve body.

3. The coolant control valve of claim 1, wherein at least one of a primary power source and the at least one thermoelectric generator provide power to the actuator.

4. The coolant control valve of claim 1, further comprising a power management device that receives power input from at least one of a primary power source and the at least one thermoelectric generator.

5. The coolant control valve of claim 4, wherein in a first power state, the power input from the at least one thermoelectric generator exceeds the power input from the primary power source.

6. The coolant control valve of claim 4, wherein in a second power state, the power input from the primary power source exceeds the power input from the at least one thermoelectric generator.

7. The coolant control valve of claim 1, wherein the at least one thermoelectric generator is overmolded within the outer housing.

8. The coolant control valve of claim 1, wherein the outer housing further comprises at least one end cover.

9. The coolant control valve of claim 8, wherein the at least one thermoelectric generator is arranged within the at least one end cover.

10. The coolant control valve of claim 1, wherein the at least one thermoelectric generator is arranged within an outer wall of the outer housing.

11. The coolant control valve of claim 1, wherein the at least one thermoelectric generator is arranged within an inner wall of the outer housing.

12. The coolant control valve of claim 1, wherein the first medium comprises air and the second medium comprises cooling system fluid.

13. The coolant control valve of claim 1, wherein the first medium comprises cooling system fluid and the second medium comprises cooling system fluid.

14. The coolant control valve of claim 1, wherein the valve body is rotationally actuated by the actuator.

15. The coolant control valve of claim 1, wherein the valve body is linearly actuated by the actuator.

16. The coolant control valve of claim 1, wherein the valve body is configured with at least one fluid opening.

17. A coolant control valve comprising:
   an actuator;
   a valve body engaged with the actuator;
   an outer housing having:
      at least one inlet; and,
      at least one outlet; and,
   at least one thermoelectric generator formed within a wall of the coolant control valve, the at least one thermoelectric generator having:
      a first surface in contact with a first medium; and,
      a second surface in contact with a second medium.

18. The coolant control valve of claim 17, wherein the at least one thermoelectric generator is formed in the outer housing.

19. The coolant control valve of claim 17, wherein the coolant control valve is configured to receive an electronic signal to move the valve body to a desired position.

20. A coolant control valve comprising:
   an actuator integrated within the coolant control valve;
   a valve body actuated by the actuator;
   an outer housing having:
      at least one inlet; and,
      at least one outlet; and,
   at least one thermoelectric generator formed within a wall of the coolant control valve, the at least one thermoelectric generator having:
      a first surface in contact with a first medium; and,
      a second surface in contact with a second medium.

* * * * *